Figure 19:
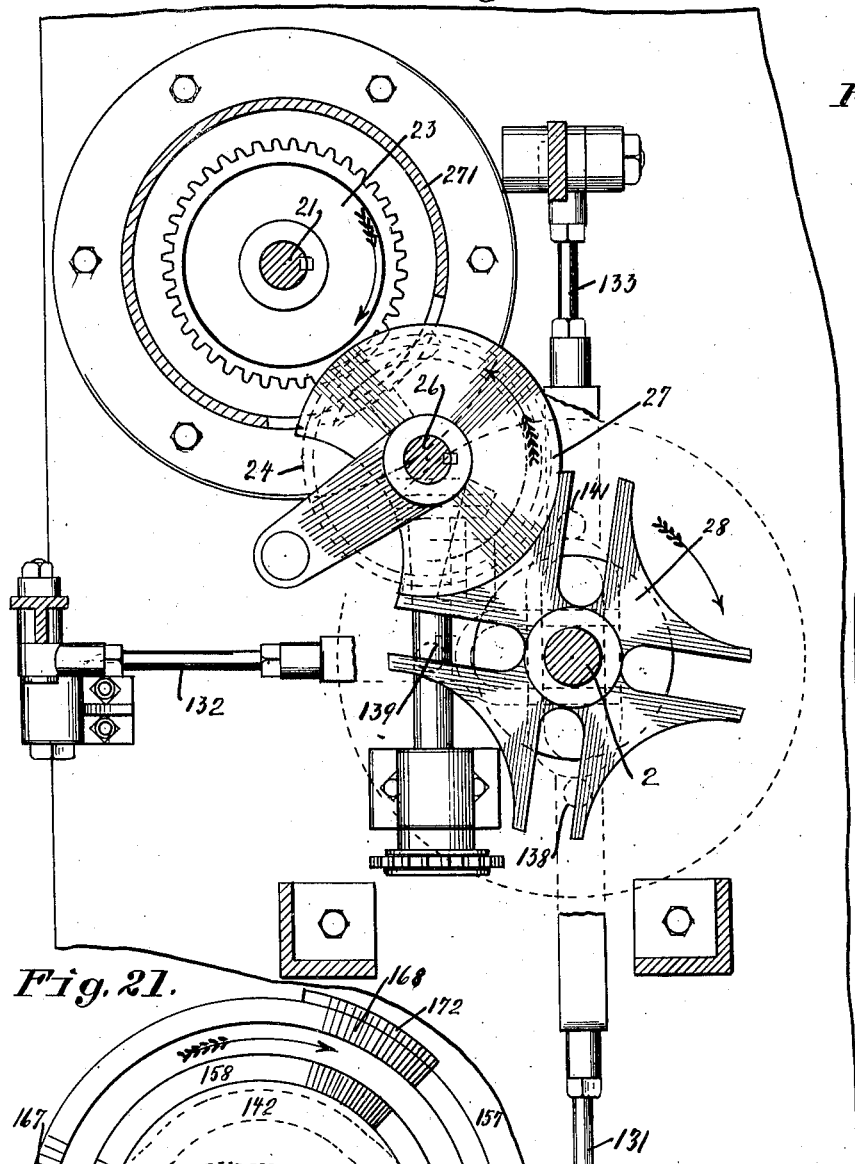

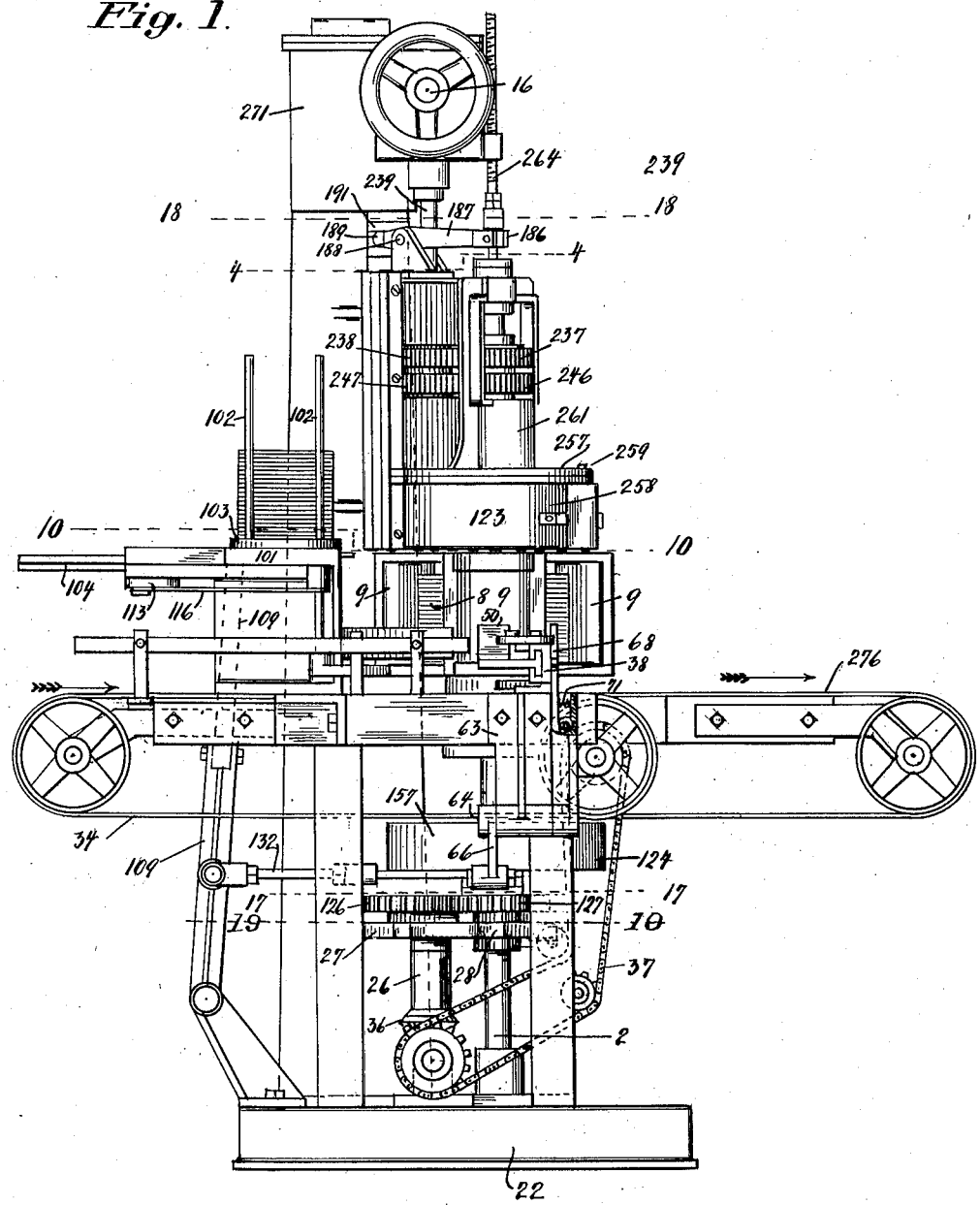

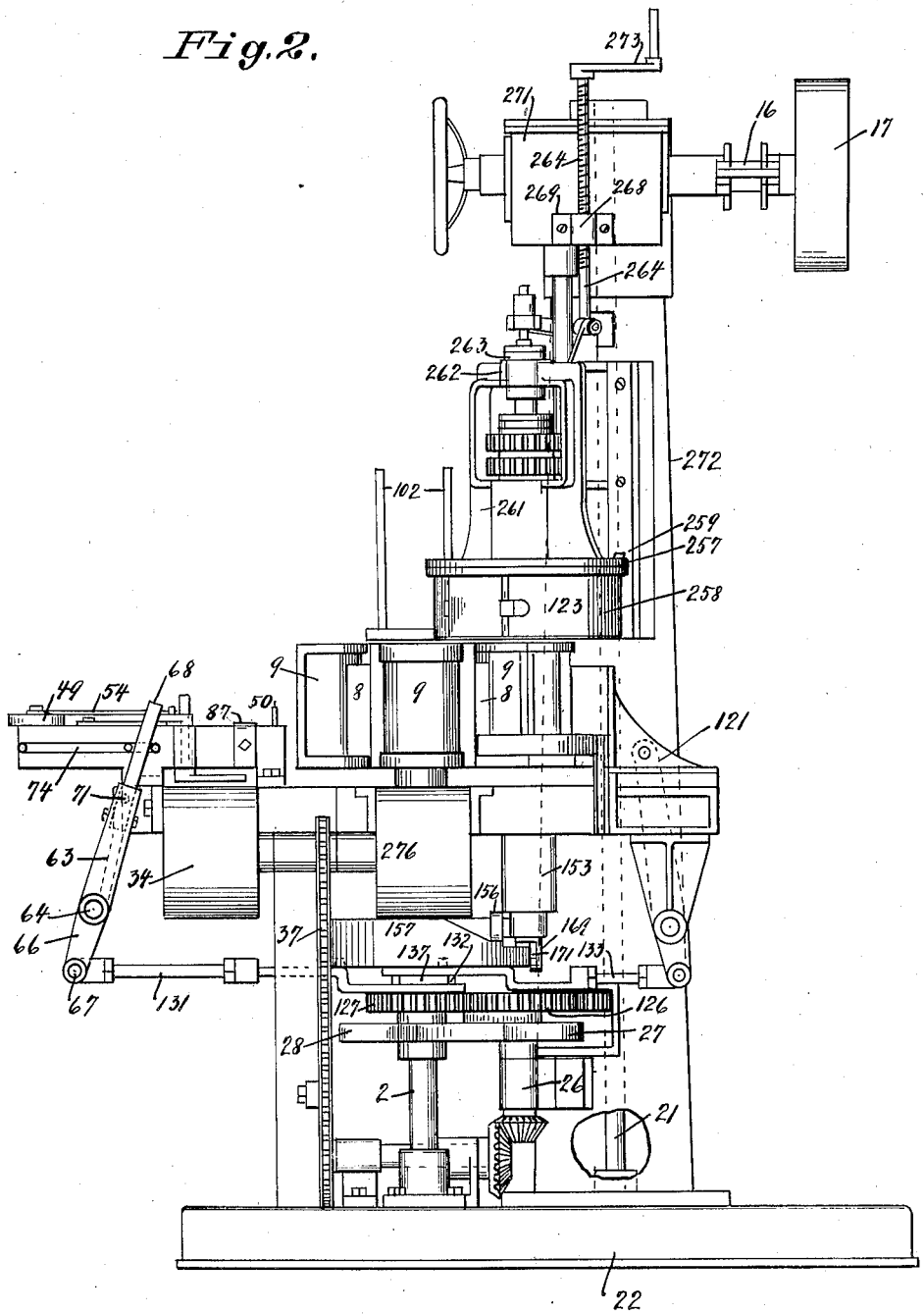

Nov. 2, 1926.  
W. E. ROONEY  
VACUUM DOUBLE SEAMER  
Filed June 1, 1922  
1,605,565  
8 Sheets-Sheet 3
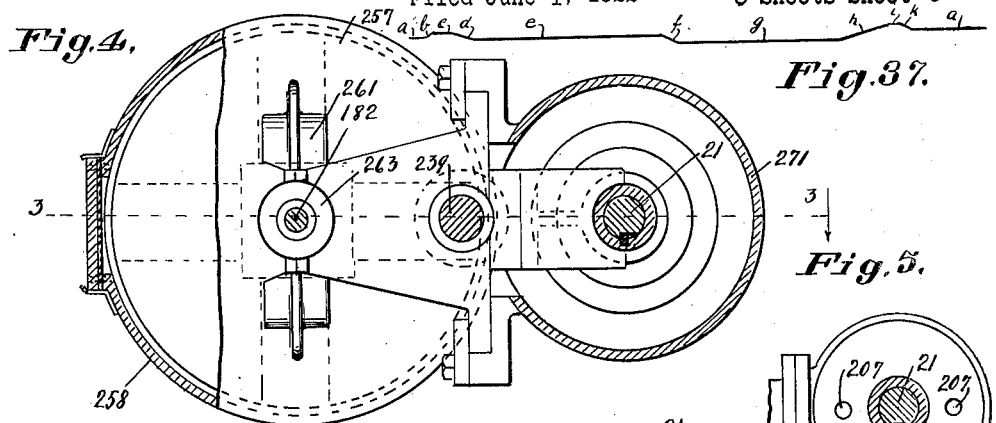
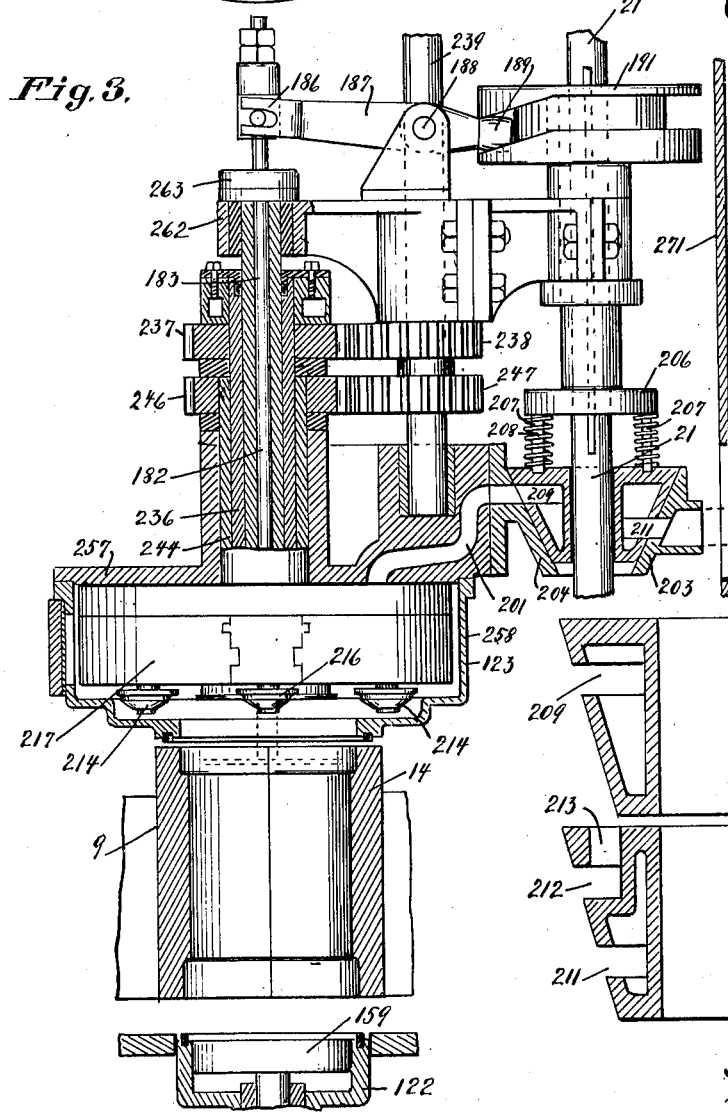
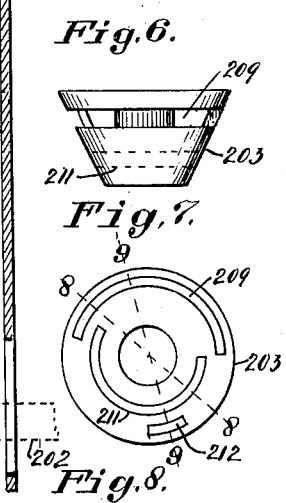
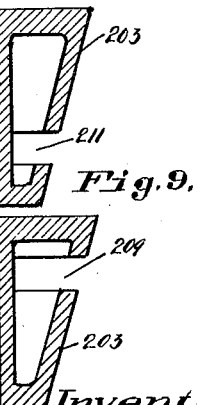

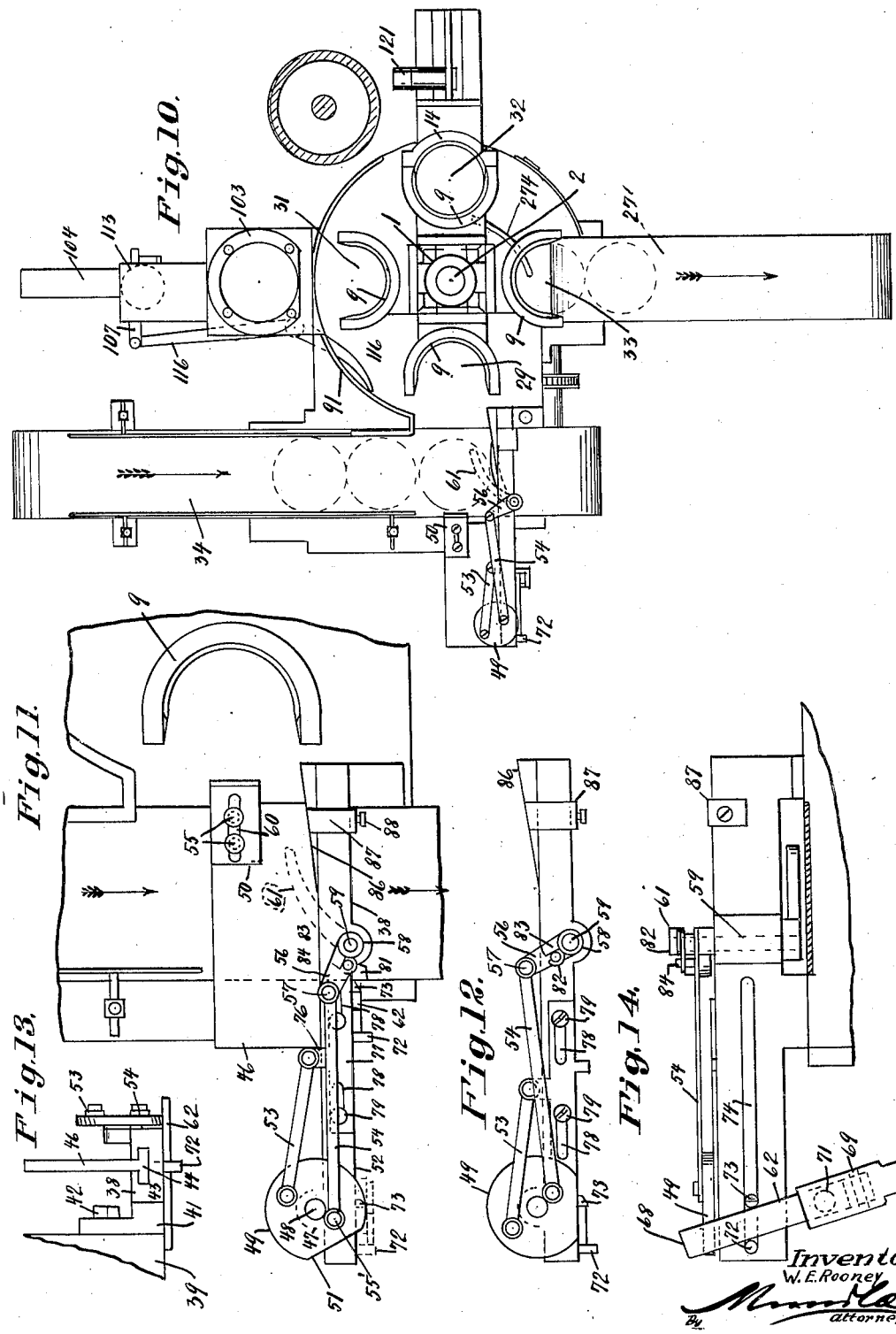

Nov. 2, 1926.
W. E. ROONEY
1,605,565
VACUUM DOUBLE SEAMER
Filed June 1, 1922
8 Sheets-Sheet 5
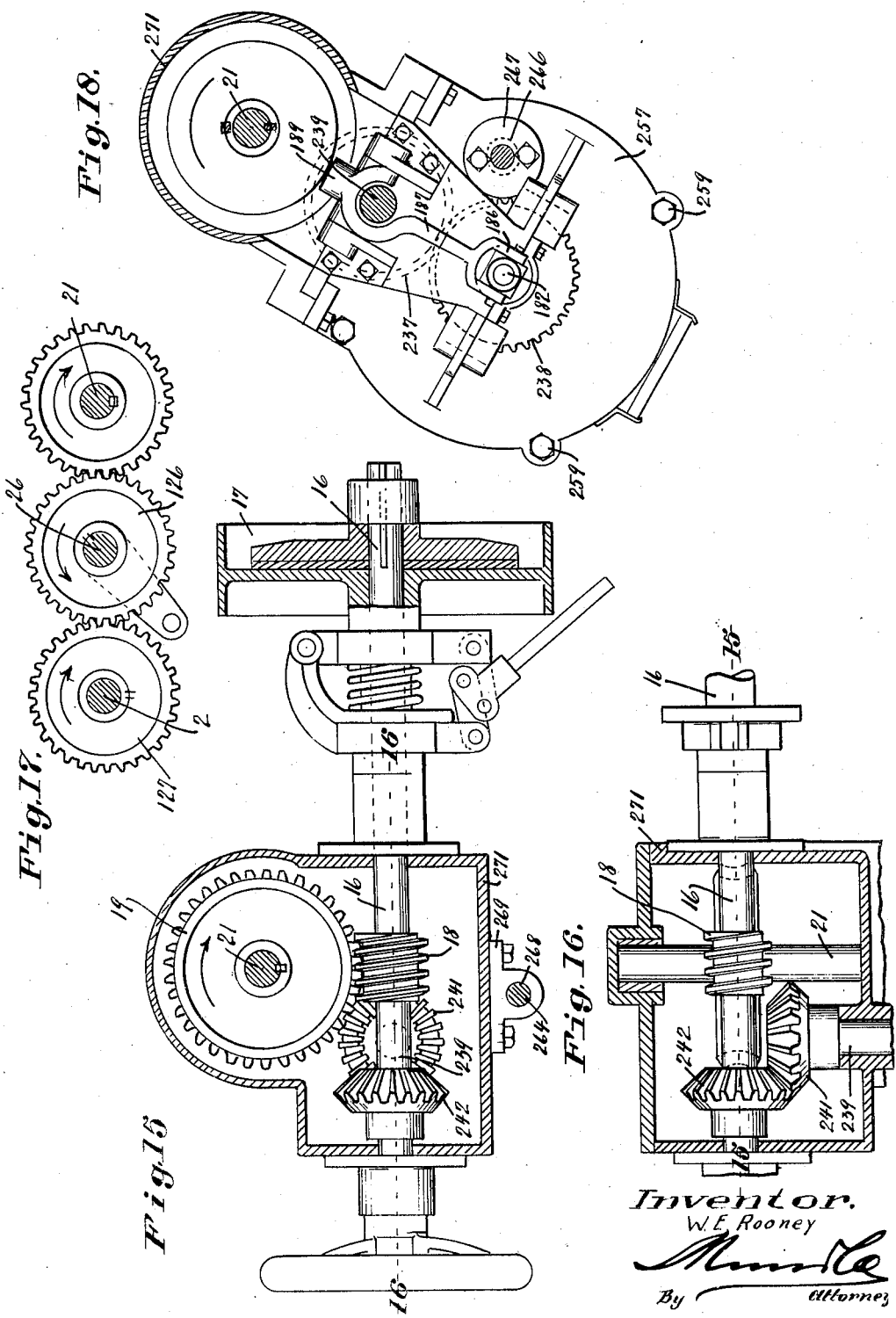
Inventor.
W. E. Rooney
By Attorney Nov. 2, 1926.

W. E. ROONEY 1,605,565

VACUUM DOUBLE SEAMER

Filed June 1, 1922    8 Sheets-Sheet 6

Inventor,
W. E. Rooney
By          Attorneys

Nov. 2, 1926.
W. E. ROONEY
VACUUM DOUBLE SEAMER
Filed June 1, 1922    8 Sheets-Sheet 7
1,605,565
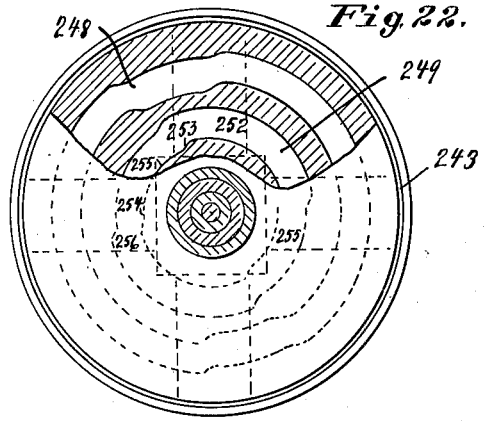
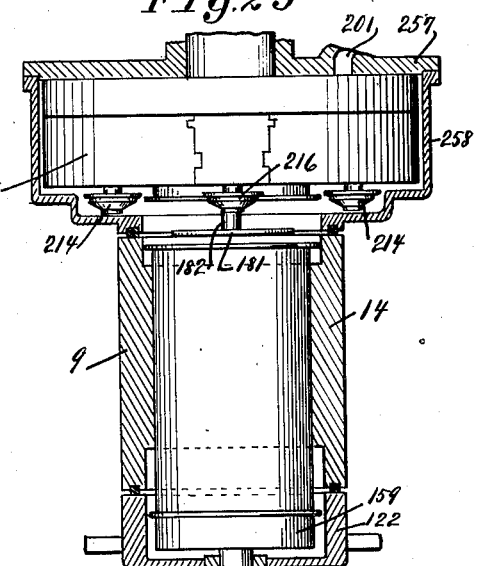
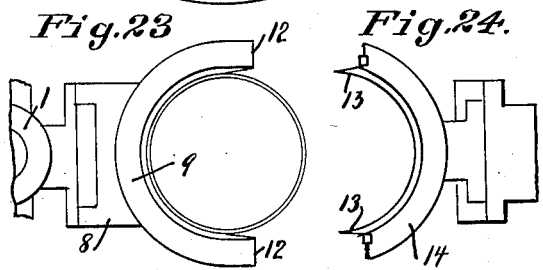
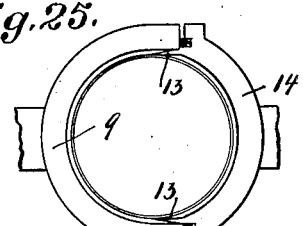
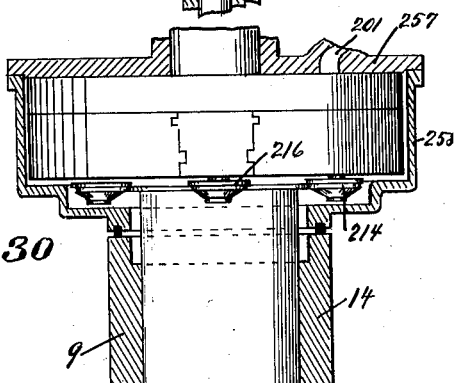
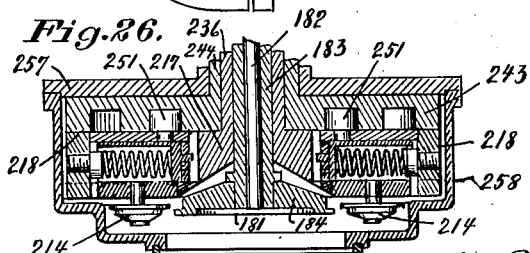
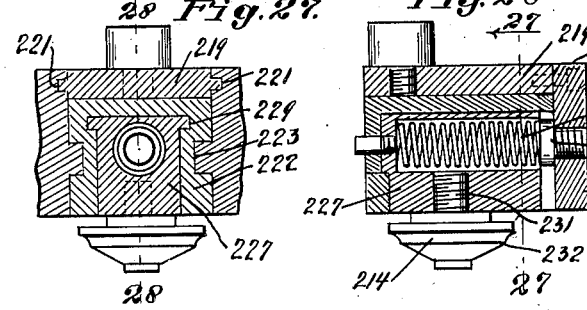
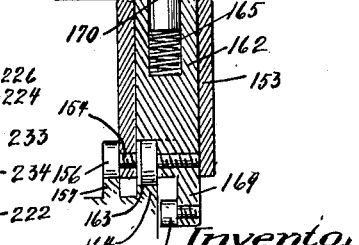
Inventor
W. E. Rooney
By   Attorney

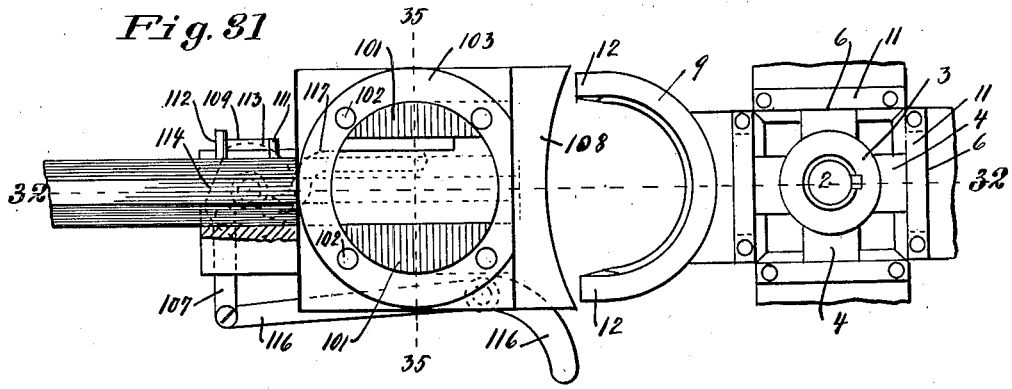
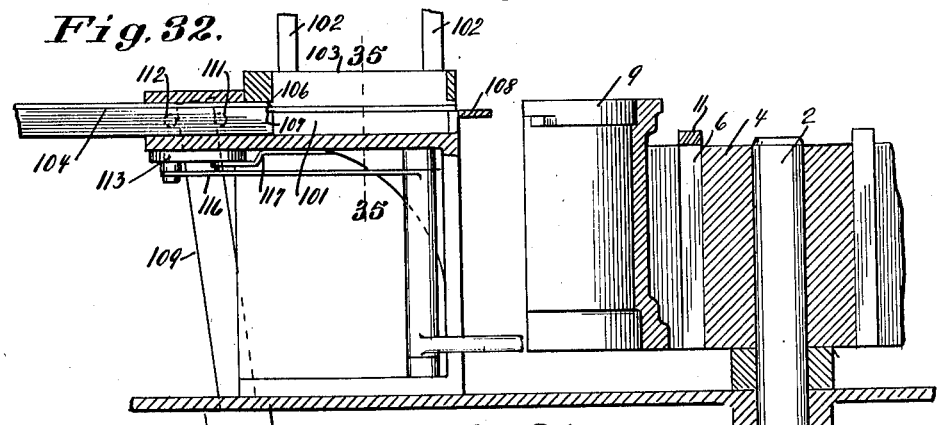
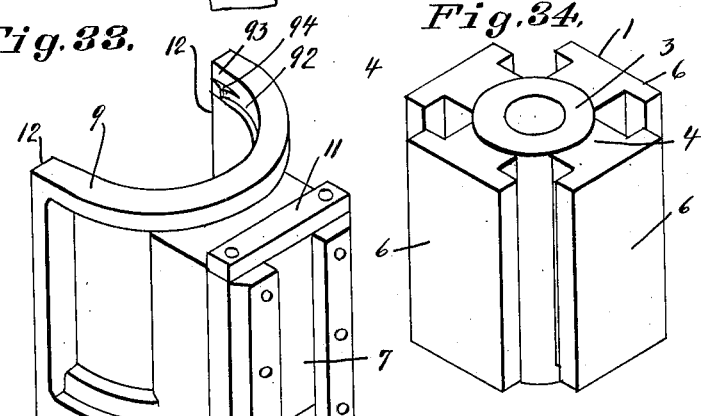
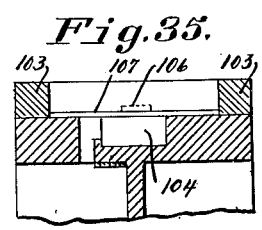
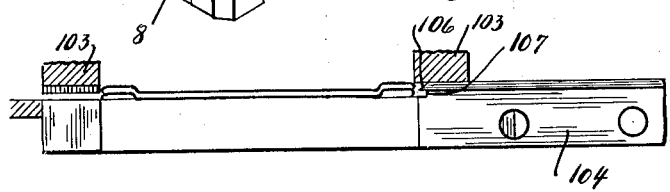

Patented Nov. 2, 1926.

1,605,565

UNITED STATES PATENT OFFICE.

WALTER E. ROONEY, OF BELLINGHAM, WASHINGTON, ASSIGNOR, BY MESNE ASSIGNMENTS, TO THERMOKEPT CORPORATION, OF SAN FRANCISCO, CALIFORNIA, A CORPORATION OF DELAWARE.

VACUUM DOUBLE SEAMER.

Application filed June 1, 1922. Serial No. 565,047.

The present invention relates to improvements in seaming devices for cans and has particular reference to a vacuum double seamer such as might be used for securing a cover to a can containing coffee, tea, or the like, while removing the air in the can in the same operation. Vacuum double seamers of this character have been used before and the object of this invention is to provide certain improvements in this device which will render the same more efficient, allow it to be driven by less power and permit of the use of a smaller vacuum pump.

It is proposed to attain this result by making the vacuum chamber enclosing the can in the seaming mechanism tight fitting, and by arranging the seaming mechanism so as to substantially fill all the space in the vacuum chamber, whereby the air to be withdrawn from the latter during each operation is reduced to a minimum. The fact that the vacuum chamber fits tightly on the can also assists in rounding the latter, whereby not only any unevenness in the surface of the can is removed but the same is also shaped so as to make a perfectly natural fit with the can cover, which facilitates the seaming operation and is conducive to the obtaining of a perfect seam.

As in other machines of the same character, the seaming is done by a plurality of rolls rotating around the rim of the can cover and gradually forcing the same in operative engagement with the top of the can. A particular feature of my invention, however, is the introduction of spring means in the operating mechanism for these rolls which allow the latter to slightly yield during their rotary motion in case the quality of the material used, particularly its thickness, varies at different points. This latter feature is adapted to eliminate cuts in the joint which might be caused by rolls unyielding in their character.

A further object of the invention is to arrange the various parts of the operating mechanism in such a manner that they may be easily exchanged for other parts suitable for cans of different dimensions, so that, practically speaking, one of my machines may be successfully used for cans varying in size to a considerable extent.

A further object of the invention is to provide a simple feeding device operated from the main driving mechanism and adapted to feed cans of any size within the range of the machine. A feeding device of the same characteristics is used for the feeding of the can covers and both feeding devices are so constructed as to be rendered operative only when actuated by a can moving into an operative position.

Further objects and advantages of my device will appear as the specification proceeds.

Figure 20:
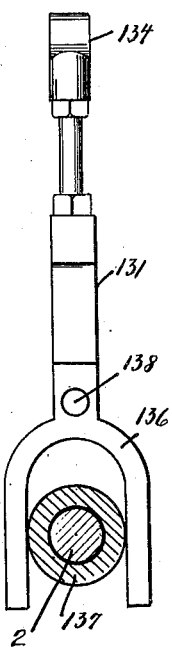
Figure 21:
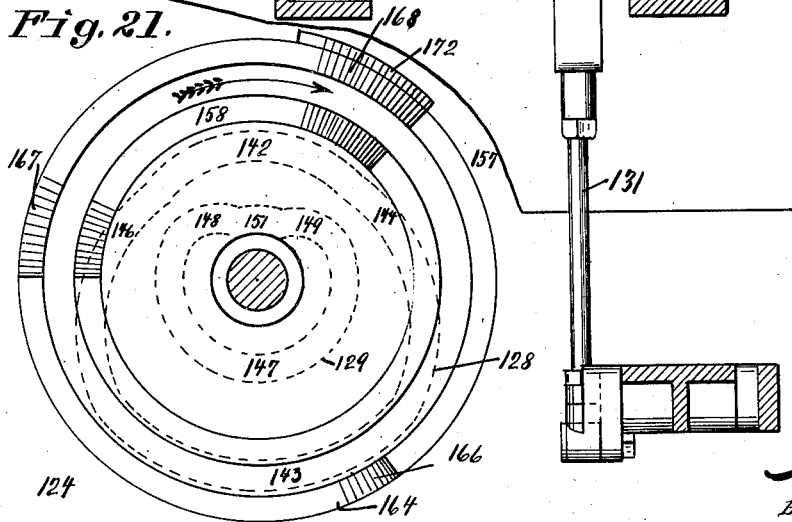

The preferred form of my invention is illustrated in the accompanying drawings, in which Figure 1 shows a side elevation of my machine; Figure 2 an elevation of the same taken at right angles to that of Figure 1; Figure 3 a vertical section through the machine along line 3—3 of Figure 4; Figure 4 a horizontal section along line 4—4 of Figure 1, with certain parts removed; Figure 5 a detail plan view of a vacuum valve; Figure 6 a side elevation of the same; Figure 7 a bottom view of the same; Figures 8 and 9 vertical sections through the valve along lines 8—8 and 9—9 of Figure 7 respectively; Figure 10 a horizontal cross section along line 10—10 of Figure 1; Figure 11 a detail plan view of the can feeding device; Figure 12 the same view showing the working parts in a different position; Figure 13 an end view of the same; Figure 14 a side elevation of the same; Figure 15 a top plan view of the whole machine; Figure 16 a vertical section through the upper part of the machine along line 16—16 of Figure 15; Figure 17 a horizontal cross section substantially along line 17—17 of Figure 1 illustrating the operative relation between certain shafts; Figure 18 a horizontal section along line 18—18 of Figure 1; Figure 19 a horizontal cross section along line 19—19 of Figure 1; Figure 20 a detail view of a driving rod for the feeding device; Figure 21 a plan view of a cam operating the can positioning device; Figure 22 a plan view partly in section of a cam operating the can cover positioning device; Figures 23 and 24 plan views of two co-operating portions of the can holding device disposed in spaced relation; Figure 25 a plan view of the two portions joined together; Figure 26 a vertical cross section through my seaming head; Figure 27 a vertical cross section through the same along line 27—27 of Figure 28; Figure 28 an enlarged sectional detail view along line 28—28 of Figure 27; Figure 29 a vertical cross section through the sealing chamber showing the can in an intermediate position; Figure 30 a similar view showing the can in its final position in which the seaming operation is performed; Figure 31 a detail plan view of the can cover feeding device; Figure 32 a side elevation of the same; Figure 33 an isometric detail view of a can holder; Figure 34 an isometric detail view of a turret slidably engaging the can holder; Figure 35 a sectional detail view of the can cover feeding device substantially along line 35—35 of Figure 31; Figure 36 a detail view illustrating the operation of the can cover feeding device, and Figure 37 the contour line of a cam actuating a cover-engaging pad.

While I have shown only the preferred form of the invention I wish to have it understood that various changes or modifications may be made as to details within the scope of the claims hereto attached without departing from the spirit of the invention.

My invention embodies in its principal features a turret, a feeding device for cans, a feeding device for covers and a seaming device.

The turret (1) is mounted on the shaft (2) and shown in detail in Figures 33 and 34. It comprises a sleeve (3) rigidly secured on the shaft (2) having four arms (4) extending therefrom in radial direction and in symmetrical arrangement, each arm terminating in a T (6) adapted to slidably engage a T-slot (7) in the frame (8) of a semi-cylindrical holding member (9). A plate (11) stretched across the T-slot (7) engages the top of the T (6) and limits the downward motion of the holding member (9) relative to the T of the turret. The holding member (9) is semi-cylindrical in form but is provided with tangential extensions (12) at its ends, (see Figure 23) adapted to receive pointed tongues (13) of the closure (14) provided in operative proximity to the can holder for the purpose of co-operating with the can holding element in enclosing the can from all sides at a certain stage of the operation.

The turret shaft (2) is caused to rotate intermittently, a quarter of a turn at a time, by the following arrangement: Referring principally to Figures 1 and 2, it will be seen that the whole device is surmounted by a horizontal shaft (16) driven from any suitable source of power through the pulley (17). This shaft (16), (see Figures 15 and 16), drives through a worm (18) a worm gear (19) mounted on the main vertical shaft (21) extending downwardly and resting on the base (22). The shaft (21) has, between the turret and the base, a gear wheel (23) mounted thereon which engages a gear wheel (24) fixed to the shaft (26), which latter supports the driving wheel (27) for the star (28) of a Geneva movement. The star is fixed to the turret shaft (2) and imparts to the same intermittent rotary motion.

In this manner the four can holding elements of the turret are caused to pass successively from a can receiving station (29), through a cover receiving station (31) and the seaming station (32) to the discharge station (33).

The cans are brought to the can feeding or can receiving station (29) on an endless conveyor (34) driven from the shaft (26) through bevel gears (36) and a chain drive (37). The conveyor passes the can holder in tangential direction and my feeding device serves to successively force the cans out of their path into the holder at the receiving station, and is illustrated in detail in Figures 11 to 14. It operates on a beam (38) supported on the table (39), which at the same time forms the base for the turret, by means of the bracket (41) secured thereto by the screw (42) and extending substantially in radial direction. The beam is provided with a T slot (43) throughout its length which is engaged by a corresponding T (44) of a plate (46), which latter thus is capable of sliding motion relative to the beam. The plate is provided at its inner end with an angular pusher (50) adapted to engage the can and secured to the plate by means of two screws (55) extending through a slot (60) in the plate. At the end of the beam is provided a bracket (47) on which is pivotally supported, as shown at (48), a disc (49), which has a segment shaped portion cut away from the same so as to form one straight edge (51). When the disc is in its normal position, as in Figure 12, the rim of the same projects beyond the edge (52) of the beam, but when the disc is turned through an operative distance its straight edge (51) overlies the beam and is flush with the same. The turning motion of the disc is brought about by means of two links (53) and (54). The latter link engages the disc pivotally, as shown at (55'), and connects at its other end with a connecting link (56) through the pin (57) and the latter link forms one arm of a bell crank lever (58) fulcrumed at (59) on the beam. The other arm (61) of this bell crank lever is curved and extends into the path of the approaching cans. When a can comes in contact with this curved arm (61) it pushes the same sideways whereby the bell crank lever is turned on its pivot (59) and the disc moved into the position indicated in Figure 12, that is, with its straight edge parallel and flush with the edge of the beam. This may be called the operative position of the disc since in this position it allows the feeding device to become operative, while in the other position shown in Figure 11 it renders the device inoperative. The plate is slid back and forth by means of a vertical lever (62) pivotally supported in a bracket (63) depending from the table, as shown at (64). Through means described hereinafter engaging the lower end (66) of the lever by means of the pivot (67), this lever is kept in rocking motion continuously. Its operative arm (68) thus slides back and forth along the edge (52) of the beam, but is allowed slight lateral motion due to the fact that it consists of two lengths pivotally joined, as shown at (69), with one length overlapping the other and a spring (71) interposed for normally forcing the upper end of the lever in contact with the beam. The T of the plate engaging the T groove in the beam is provided with two pins (72) and (73), the former being at the far end and sligthly longer than the latter, which presents a slanting surface. The distance between the two pins is such that they allow the lever (62) to become engaged between the same. They extend through a slot (74) in the T groove and are engaged by the lever (62) on its back stroke provided the disc is in its operative position. When, however, the disc is in the position shown in Figure 12, that is, with its curved face projecting beyond the edge of the beam it will prevent the lever from engaging the pins. The link (53) serves to return the disc to its inoperative position. Its forward end pivotally engages a lap (76) extending from a strip of metal (77) adapted to ride on the beam (38), its two slots (78) engaging pins (79) rising from the beam. At its forward end this strip terminates in a lateral projection (81) adapted to be engaged by the lever (62) on its forward stroke. It may be mentioned that instead of the rigid bell crank lever (58) I preferably use two arms (56) and (61) independently supported on the pivot (59) and joined by means of a spring (82) connecting a nose (83) associated with the arm (61), with a stud (84) rising from the arm (56) whereby the connection between the two arms is rendered yieldable.

The operation of the feeding device may be described as follows: Normally the lever (62) rocks back and forth along the edge (52) of the beam without doing any work. If a can is pushed forward on the conveyor so as to come in contact with the lever arm (61) it pushes the same forward, whereby the disc (49) is turned into its operative position by means of the lever arm (56) and the link (54). The straight edge of the disc now being flush with the edge of the beam (38) the vertical lever (62) is allowed to enter the space between the two pins (72) and (73) at the end of its backward stroke, and to bear against the pin (73) on the forward stroke so as to push the T sliding in the T groove of the beam and with it the plate (46) forward, which latter plate engages the can and pushes the same sideways into the can holder of the turret. At the end of the forward stroke the lever (62) engages the projection (81) of the metal strip (77) and pushes the same forward, whereby the disc is returned to its inoperative position due to the action of the link (53). On the following backward stroke the lever (62) is forced out of engagement with the pin (73) by the disc (49) without, however, losing contact with the pin (72), which enables it to return the plate to its original position. The return of the disc to its inoperative position will naturally return the lever arm (61) to its original position, but it might happen that a plurality of cans are lined up in front of the same which the working mechanism of the disc would not be strong enough to push back. To allow for this emergency I provide the spring connection (82) between the lever arms (56) and (61) which allows the arm (61) to remain in the position given to it by the preceding can without interfering with the operativeness of the device, the spring (82) now assuming its function and pulling the disc into an operative position during the next backward stroke of the lever (62).

It will be noted that the beam (38) is not exactly alined with the inner edge of the can holding member of the turret but remains slightly outside the same so that normally, under the conditions shown in Figure 12, a can pushed into the turret would strike the side wall of the holding member. To prevent this I provide a slanting spring guide (86) adapted to be set by means of a clip (87) and a screw (88) to deliver the can centrally with reference to the holding member. This arrangement is selected because in this manner the guiding member (86) can be set to fit different sized holding members.

After the can has thus been engaged by the holding member the turret is rotated through a quarter of a turn, the can being held in position by means of a peripheral guide (91). The next station is the can cover feeding station which works substantially along the same lines as the can feeding station. This device is illustrated in detail in Figures 31 and 32. It should be explained first, however, that a peripheral seat (92) is provided in the top portion of the can holder on which the can cover is to be placed, the latter being of larger diameter than the can itself. A problem to be solved in this connection is the placing of the cover in such a manner that it will not leave its place during the continuation of the turn. It will be remembered that the can holder is provided with tangential extensions (12), which, however, do not lock the can in the holding member, the stationary guide members previously mentioned performing this function. The peripheral seat (92) for the cover also extends beyond the semi-circle in tangential lines, as shown at (93), but the lower portion of the back of the seat is provided in this extension with a projection (94) following the outline of the circle of the holding member, allowing the can cover to be inserted laterally above the projection and then to drop into its seat so as to be locked by the projection. The surface of the platform (101), on which a stack of can covers is supported between posts (102) with a ring (103) surrounding the lower ones of the covers except the lowermost so as to keep the same in perfect alinement, is substantially flush with the upper portion of the cover seat in the can holder so that a can cover discharged from the stack laterally is fed into the holding member above the projection (94), being allowed to drop into its seat after it has passed the latter. The lowermost of the can covers is separated from the remainder and pushed into the can holder of the turret by means of the parting knife (104) slidably supported in the platform in operative relation to the stack. The exact operation is illustrated in Figure 36 from which it will be seen that the parting knife is provided with a nose (106) adapted to push itself between the lowest cover and the adjacent one so as to slightly lift the whole stack except the lowest one, while the latter is engaged by a recess (107) underneath the nose and pushed outwardly underneath the ring (103) which holds all the other covers and over the projection (108) of the platform into the can holder of the turret. The parting knife is operated in the same manner as the plate of the can feeding device, that is by means of a continuously rocking lever (109) engaging two pins (111) and (112) extending laterally from the parting knife, while a disc (113) having a straight edge (114) is turned into an operative position by means of the lever (116) adapted to be struck by the can while traveling from the first station to the second, and returned to its inoperative position by a second link (117) engaged by the lever (109) on its forward stroke. The means for rocking the lever will be described hereinafter.

When the holder is thus ready to leave the second station it will be understood that it holds a can in its body and the can cover in its peripheral seat above and in spaced relation to the can, the two not being in contact at this time. On the next turn of the turret the particular can holder we have been following up passes to the third or seaming station.

The next operation to be performed comprises the enclosing of the can in an airtight chamber, the removal of the air out of this chamber whereby a vacuum is created in the can, and the seaming of the can while this vacuum is maintained.

The device performing these functions includes in its general features the can holder described in the previous paragraphs enclosing one-half of the can, the closure (14) previously referred to adapted to be brought into contact with the holding member by means of the lever (121), (see Figure 2), actuated by means to be described hereinafter and surrounding the other half of the can, a bottom member (122) and a top member (123) enclosing the seaming device. The three levers, (62), actuating the can feeding device, (109), actuating the can cover feeding device, and (121), actuating the closure, are all operated by the cam (124) rotatably supported on the turret shaft (2) underneath the turret. Rotary motion is imparted to this cam from the cam shaft (21) through the gear wheel (126) on the intermediate shaft (26) and the gear wheel (127) on the turret shaft (2), which latter gear wheel forms an integral part of the cam (124). This cam is provided in its lower surface, as indicated in dotted lines in Figure 21, with two grooves (128) and (129), the former driving the can feeding and the can cover feeding levers, while the latter drives the closure lever (121). The connecting rods (131), (132) and (133) for the rocking levers are alike in form and one of them is shown in detail in Figure 20. One end (134) of these connecting rods is supported in its respective connecting lever while the other end, terminating in a fork (136), straddles the collar (137) on the turret shaft (2), the lower fork resting on the gear wheel (127) and the other forks on the lower one. Pins (138), (139) and (141) rising from the surface of the rods engage the respective grooves in the lower surface of the cam (124). The outer groove (128) engaged by the two rods (131) and (132) controlling the can feeding and can cover feeding devices has two circular portions (142) and (143) causing the rocking lever to remain stationary, a rising portion (144) causing the inward or working stroke of the said lever and a falling portion (146) causing its outward stroke. The groove (129) actuating the closure resembles in its outlines a heart, a long circular portion (147) allowing the closure to remain in its closing position for a long time, while two short kinks (148) and (149) cause a rapid engagement and dis-engagement of the closure with the can holder, and a short circular portion (151) allows of a short pause in the dis-engaged position.

After the closure has been engaged with the can holder the situation resembles that illustrated in Figure 3, that is, the can is enclosed laterally but neither the bottom (122) nor the top (123) of the vacuum chamber are in contact with its body portion. The bottom (122) is provided with a central perforation from which extends downwardly a sleeve (153) (see Figure 30), supporting on a pin (154) a roller (156), which latter rides on a cam (157) rising from the upper surface of the cam wheel (124). This cam has a raised portion (158) which causes the bottom portion (122) of the vacuum chamber to rise so as to bring the same in contact with the body portion of the chamber, and to raise the latter into operative contact with the top of the sealing chamber which latter remains stationary. During this latter operation the can itself within the sealing chamber has been raised independently of the chamber by means of the plunger (159) provided with means (162) extending through the sleeve (153) of the bottom, and adapted to ride with its lower surface (163) on the cam (164) on the upper surface of the cam wheel (124) previously referred to. The connection between the plunger and the member (162) is made yielding by the spring (165) and the pin and slot arrangement (170) which allows for a slight variation in the size of the can to be seamed. It will be seen that this cam presents two rises (166) and (167) causing the plunger to rise stepwise for purposes explained hereinafter and one drop (168) returning the plunger to its initial position. To make this return positive so as not to rely on the weight of the plunger alone, I provide an extension (169) on the member (162) on which is supported a roller (171) traveling around the outer periphery of the cam wheel (124) and engaging, during the drop at (166), the lower surface of the guiding member (172) extending outside the periphery of the cam wheel (124).

The mechanism thus far described includes the closing of the vacuum or sealing chamber and the raising of the can into an operative position in two steps, all these changes being brought about by the cam wheel (124) rotating at the same speed as the main shaft (21). It will be remembered that when the can holder lands at the third station the can and the can cover were supported therein in spaced relation to each other. Therefore, when the can is raised it is raised into the cover, but means have to be provided for holding the cover so that the latter may remain in contact with the can. For this purpose I provide the pad (181) at the lower end of the stem (182) (see Figures 3 and 26), centrally and slidably supported in the stationary hollow shaft (183) provided at its lower end with the stationary seaming chuck (184). The stem (182) is engaged at its top by the forked end (186) of a lever (187) pivotally supported at (188) and terminating at its other end in a roller (189) engaging the cam wheel (191) splined to the main shaft (21). The operation of the pad may be briefly described as follows: It first descends to meet the cover, then rises a short distance corresponding to the first rise of the plunger, comes to a stop, at which time the air is extracted, rises again corresponding to the second rise of the plunger, comes to a stop again for the seaming operation, descends rapidly to assist in ejecting the can and rises again to its initial position. The exact shape of the cam actuating the pad is shown in Figure 37, it being understood that due to the lever action each rise in the line represents a drop of the pad and each drop in the line a rise in the pad. Thus beginning at the left hand side of the line, (a) represents the initial position, (b) the first drop, (c) the first rest, (d) the first rise, (e) the stop during which the air is extracted, (f) the second rise, (g) the period of the seaming operation, (h) the drop assisting in the ejection of the can, (i) a short stop, and (k) the rise to its original position.

The complete positioning operation then is as follows: As the can holder enters the third station the closure moves laterally to enclose the can circumferentially, the pad descends to engage the cover, the bottom of the vacuum chamber rises to make contact with the body portion and to force the latter in engagement with the top portion, while simultaneously the plunger rises to force the can upward. As soon as this upward motion begins the pad starts to rise again in unison with the plunger so that the can and the holder are centered between the same. After rising through a certain distance the pad and plunger come to a stop simultaneously and allow the air to be withdrawn from the can. Then the rise is continued until can and cover arrive at the seaming chuck (184) when both again stop for the seaming operation. When this operation is completed the plunger as well as the bottom portion of the vacuum chamber descend to their original position while the pad accompanies this motion with a short downward stroke, whereby the top of the can is forced out of the top of the vacuum chamber and then returns to its initial position.

The air is extracted from the vacuum chamber through the port (201) by a vacuum pump, not shown in the drawing, connecting with the pipe (202), a valve (203) controlling the air passage. The latter, which is illustrated in detail in Figures 6 to 9, is slidably mounted on the shaft (21), is conical in shape and rests on the conical seat (204). It is actuated by means of the collar (206) through the pins (207), the springs (208) holding it or its seat. The slot (209) extending almost half way around the valve as shown in Figure 7 communicates with the port (201) when in an operative position, while at the same time the slot (211) in the valve registers with the pipe (202) connecting with the vacuum pump. In this position air is allowed to be exhausted from the vacuum chamber. As the valve is rotated the slot (209) and the slot (211) are dis-engaged from their respective ports, but during a short period of the rotation a third port (212) connecting with the atmosphere, as shown at (213), Figure 9, engages with the port (201) and allows air to re-enter the vacuum chamber. In this manner the chamber is exhausted and re-filled during each seaming operation.

After the air has been withdrawn from the can the latter is lifted to its uppermost position in which the cover of the can is engaged by the seaming chuck (184), so that the latter firmly rests against the raised rim of the cover. The seaming operation is performed by rolls rotating around the joint and gradually closing in on the can so as to curl and press the margin of the cover and the flange of the rim into one firm compact unit. Two pairs of rolls (214) and (216) are provided for this purpose, the rolls forming a pair being disposed diametrically opposite to each other and the two pairs being positioned at right angles to each other. The rolls are supported in the seaming head (217) which is cylindrical in shape and provided with four radial slots (218). In each of these slots is slidably supported a rectangular block (219) engaging the same by the tongue and groove arrangement (221). A second block (222) is also slidably supported in this radial slot underneath the member (219) by the tongue and groove arrangement (233). The second block is secured to the first block by means of a screw (224) penetrating a flange (226) of the second block so that the two blocks form one unit. Another block (227) slidably engages a groove in the second block by means of its T head (229) and carries on the pin (231) the roll (214). The whole unit is thus slidable in the radial slot while the spring (233) inside of the inner block (227) pressing against a head (234) secured to the block (222) allows of slight yielding action of the block (227) supporting the roll relative to the block (222).

The seaming head (217) is rotated by means of a hollow shaft (236) disposed concentrically around the stem (182) of the pad and carrying at its upper end a gear wheel (237) engaging another gear wheel (238) mounted on the shaft (239). The latter shaft terminates in the bevel gear (241) which is driven by the bevel gear (242) on the main horizontal drive shaft (16). The shaft (239) rotates considerably faster than the main vertical shaft (21), in a machine now in operation the shaft (21) rotating once for each can while the shaft (241) rotates forty times during the same interval.

Radial motion is imparted to the blocks carrying the rolls by means of the cam wheel (243) mounted above the seaming head and rotated by means of a sleeve (244) carrying at its upper end the gear wheel (246) meshing with the gear wheel (247) on the shaft (239). The cam wheel rotates slightly faster or slower than the seaming head, the difference between the two being one turn per can, or in other words, while the seaming head rotates forty turns the seaming cam makes thirty-nine turns per can. The cam wheel (243) shown in detail in Figure 22 is provided with two cam grooves (248) and (249), each groove actuating one pair of seaming rolls through the rollers (251). The inner pair of rollers is engaged by the inner cam groove (249), and the operation of each may be described as follows: While sliding along the circular part (252) of the groove the seaming roll controlled by the same is out of contact with the joint to be seamed altogether, this period being used for the positioning of the can and the can cover. When the roller reaches the point (253) the seaming roll is forced inwardly at a rapid pace and engages the rim of the can cover so as to curl the same. The roll keeps gaining on the joint constantly during a number of turns around the can due to the fact that the curve (255) has a slight centerwise tendency, until it reaches the point (254) in the cam groove, when it makes one additional circular turn for finishing purposes. Thereupon it is forced outwardly by the curve (256) and returns to its original inactive position. The other roll of the same pair acts in the same manner. The outer rolls associated with the cam groove (248) then become active following a similar cycle of operations. The principal function of the inner rolls is to curl the rim of the can cover and the flange of the can into each other, while the second rolls press this curl into a firm compact unit.

The whole seaming device is enclosed in a housing comprising the plate (257) from which depends a bell (258) secured thereto by means of bolts (259). A frame (261) is supported on the plate (257) and supports the sleeve (262) on which the collar (263) rests, which latter is secured to the seaming chuck supporting shaft (183). The plate (257) on which the whole seaming device rests is supported by means of a rod (264), the head (266) (see Figure 18), of which engages a socket (267) in the plate and the upper end of which is threaded and passes through a threaded hole (268) in the bracket (269) secured to the housing (271), in which the upper drive shaft rotates and which is supported on the main column (272) resting on the base (22). The rod (264) terminates in a crank (273) and by rotating the crank the whole seaming device may be lifted or lowered to suit cans of different heights.

The seaming device may be readily taken apart and its working parts interchanged for such of different dimensions. To take the device apart it is only necessary to unscrew the screws (259) holding the bell (258) to the plate (257), to lower the bell, and remove the screws (224) whereupon the blocks holding the rolls may be taken out radially and exchanged for others. The seaming chuck (184) is screwed to the hollow shaft supporting the same and may be easily exchanged. The pad (181) is also screwed to its shaft.

After the can has been seamed the rotation of the turret is continued and the can slowly forced out of the can holder by the stationary guide (274). At the 4th station it is delivered to the conveyor (276) which carries the can away from the machine.

The whole operation of the device may be briefly stated as follows: Cans are successively brought opposite the holding member at the station (29) and engaged with the latter by means of the can feeding device disposed at that station. The turret thereupon is caused to rotate through a quarter of a turn by means of the Geneva movement illustrated in Figure 19, the motion being transmitted from the shaft (21), through the shaft (26), to the turret shaft (2). At the second station the can cover is fed into the holder by means of the cover feeding device, and the can holder then passes on to the third station where the seaming operation takes place, consisting principally of means for positioning the can and can cover, for exhausting the air and for seaming the cover to the can. During its travel from the third station to the fourth station the can is slowly ejected and delivered to the conveyor (276).

The whole device is driven from the horizontal drive shaft (16) surmounting the machine which transmits slow rotary motion to the main shaft (21), and fast rotary motion to the shaft (239). The slow shaft (21) actuates the cam (191) controlling the pad engaging the top of the cover in the seaming head, the valve (203) for the vacuum pump, the turret shaft through the Geneva movement and the main cam (124) through the gear wheels (126) and (127). The main cam (124) operates through its lower grooves the can feeding device, the cover feeding device, and the closure for the can holder, and through its upper grooves the bottom portions (122) of the vacuum chamber as well as the plunger (159) for stepwise raising the can. The speed shaft (239) drives the seaming mechanism comprising the cam (243) and the seaming head (217) at differential speed in the manner described.

I claim:

1. In a sealing chamber in a device of the character described, two complementary cylinder halves adapted to surround and grip a can to be sealed, means associated with one of said halves for forcing the same in operative contact with the other one, and a turret comprising a sleeve and a plurality of arms extending from said sleeve for engaging complementary cylinder halves and moving the same in place.

2. In a sealing chamber for a device of the character described, two complementary halves adapted to completely surround and grip a can, means associated with one of said halves for forcing the same in operative contact with the other one laterally and a removable turret member for engaging said complementary halves.

3. In a vertically disposed sealing chamber for a device of the character described, a top member, a bottom member mounted with freedom of vertical sliding motion, a cylindrical member intermediate said top and bottom members adapted to enclose a can and means for raising the bottom member for successively forcing the same in contact with the intermediate member and the latter in contact with the top member.

4. In a vertically disposed sealing chamber for a device of the character described, a top member, a bottom member mounted with freedom of vertical sliding motion, a cylindrical member intermediate said top and bottom members adapted to enclose a can and a rotatably mounted cam engaging the bottom member for successively forcing the same in contact with the intermediate member, and the latter member in contact with the top member.

5. In a vertically disposed sealing chamber for a device of the character described, a top member, a bottom member mounted with freedom of vertical sliding motion, a cylindrical member intermediate said top and bottom members adapted to enclose a can and a rotatably mounted cam engaging the bottom member for successively forcing the same in contact with the intermediate member, and the latter member in contact with the top member with gaskets interposed between the engaging members for rendering the engagement air-tight.

6. In a vertically disposed sealing chamber for a device of the character described, a top member, a bottom member mounted with freedom of vertical sliding motion, a cylindrical intermediate member comprising two complementary halves adapted to enclose a can, means associated with one of them for forcing the same in operative contact with the other laterally and means for raising the bottom member for successively forcing the same in contact with the intermediate member and the latter in contact with the top member.

7. In a vertically disposed sealing chamber for a device of the character described, a top member, a bottom member mounted with freedom of vertical sliding motion, a cylindrical intermediate member comprising two complementary halves adapted to enclose a can, means associated with one of them for forcing the same in operative contact with the other laterally and a rotatably mounted cam engaging the bottom member for successively forcing the same in contact with the intermediate member and the latter in contact with the top member.

8. In a vertically disposed sealing chamber for a device of the character described, a top member, a bottom member mounted with freedom of vertical sliding motion, a cylindrical intermediate member comprising two complementary halves adapted to enclose a can, means associated with one of them for forcing the same in operative contact with the other laterally and a rotatably mounted cam engaging the bottom member for successively forcing the same in contact with the intermediate member and the latter in contact with the top member with gaskets interposed between the engaging surfaces for rendering the engagement air-tight.

9. In a sealing chamber for a device of the character described, a cylindrical member for holding a can, a plunger associated with the bottom of the same and means for raising the plunger in two steps at predetermined times whereby the can is lifted stepwise.

10. In a sealing chamber for a device of the character described, a cylindrical member for holding a can, a plunger associated with the bottom of the same and a rotatably mounted wheel having a two-stepped cam thereon engaging the plunger for raising the same in two steps at predetermined times whereby the can is lifted stepwise.

11. In a sealing chamber for a device of the character described, a cylindrical member for holding a can and a can cover above the same in spaced relation thereto, a pad slidably mounted above the cover, means for causing the same to descend at predetermined times so as to hold the cover, a plunger associated with the bottom, and means for raising the plunger at predetermined times whereby the can is lifted to engage the cover.

12. In a sealing chamber for a device of the character described, a cylindrical member for holding a can and a can cover above the same in spaced relation thereto, a pad slidably mounted above the cover, means for causing the same to descend at predetermined times so as to hold the cover, a plunger associated with the bottom, and means for raising the plunger at predetermined times whereby the can is lifted to engage the cover, the pad actuating means being adapted to raise the pad when the engagement between the cam and the cover has been effected so as to move upwardly in unison with the motion of the plunger.

13. In a sealing chamber for a device of the character described, a cylindrical member for holding a can and a cover above the same in spaced relation thereto, a pad slidably mounted above the cover, a cam wheel mounted above the same for causing it to descend at predetermined times so as to hold the cover, a plunger associated with the bottom, and a rotatably mounted cam wheel engaging the plunger for raising the same at predetermined times whereby the can is lifted to engage the cover.

14. In a sealing chamber for a device of the character described, a cylindrical member for holding a can and a cover above the same in spaced relation thereto, a pad slidably mounted above the cover, a cam wheel mounted above the same for causing it to descend at predetermined times so as to hold the cover, a plunger associated with the bottom, and a rotatably mounted cam wheel engaging the plunger for raising the same at predetermined times whereby the can is lifted to engage the cover, the pad actuating cam wheel being adapted to raise the pad when the engagement has been perfected so as to move upwardly in unison with the motion of the plunger.

15. In a sealing chamber for a device of the character described, a cylindrical member for holding a can and a can cover above the same in spaced relation thereto, a pad slidably mounted above the cover, means for causing the same to descend at predetermined times so as to hold the cover, a plunger associated with the bottom, and means for raising the plunger in two steps, whereby the can is lifted stepwise and during which time the can engages the cover, and for lowering the same at predetermined times, the pad actuating means being adapted to raise the pad when the engagement between the can and the cover has been effected and to lower the same thereafter in unison with the motion of the plunger.

16. In a vertically disposed sealing chamber for a device of the character describe, a top member, a bottom member mounted with freedom of vertical motion, a cylindrical intermediate member adapted to enclose a can, means for raising the bottom member for successively forcing the same in contact with the intermediate member and the latter in contact with the top member, a plunger associated with the bottom member and means for raising the plunger at predetermined times whereby the can is lifted independently of the bottom member.

17. In a vertically disposed sealing chamber for a device of the character described, a top member, a bottom member mounted with freedom of vertical motion, a cylindrical intermediate member adapted to enclose a can, and a can cover above the same in spaced relation thereto, means for raising the bottom member for successively forcing the same in contact with the intermediate member and the latter in contact with the top member, a pad slidably mounted above the cover, means for causing the same to descend at predetermined times so as to hold the cover, a plunger associated with the bottom and means for raising the plunger at predetermined times whereby the can is lifted to engage the cover.

18. In a vertically disposed sealing chamber for a device of the character described, a top member, a bottom member mounted with freedom of vertical motion, a cylindrical intermediate member adapted to enclose a can and a can cover above the same in spaced relation thereto, means for raising the bottom member for successively forcing the same in contact with the intermediate member and the latter in contact with the top member, a pad slidably mounted above the cover, means for causing the same to descend at predetermined times so as to hold the cover, a plunger associated with the bottom and means for raising the plunger at predetermined times whereby the can is lifted to engage the cover, the pad actuating means being adapted to raise the pad when the engagement between the can and the cover has been effected so as to move upwardly in unison with the motion of the plunger.

19. In a vertically disposed sealing chamber for a device of the character described, a top member, a bottom member mounted with freedom of vertical motion, a cylindrical intermediate member adapted to enclose a can and a can cover above the same in spaced relation thereto, means for raising the bottom member for successively forcing the same in contact with the intermediate member and the latter in contact with the top member, a pad slidably mounted above the cover, means for causing the same to descend at predetermined times so as to hold the cover, a plunger associated with the bottom and means for raising the plunger at predetermined times, whereby the can is lifted to engage the cover, and for lowering the same.

20. In a vertically disposed sealing chamber for a device of the character described, a top member, a bottom member mounted with freedom of vertical motion, a cylindrical intermediate member adapted to enclose a can and a can cover above the same in spaced relation thereto, means for raising the bottom member for successively forcing the same in contact with the intermediate member and the latter in contact with the top member, a pad slidably mounted above the cover, means for causing the same to descend at predetermined times so as to hold the cover, a plunger associated with the bottom and means for raising the plunger at predetermined times, whereby the can is lifted to engage the cover, and for lowering the same, the pad actuating means being adapted to raise and lower the pad in unison with the motion of the plunger after the engagement between the can and the cover has been effected.

21. In a device of the character described, a seaming head, a seaming mechanism enclosed therein, driving means for the latter associated with the seaming head so as to form a complete unit with the same and means for lowering and raising the whole unit whereby the same may be adapted to cans of different length, said means comprising a rod extending from the seaming head, a stationary support for the same, and threaded means for raising and lowering the rod.

22. In a device of the character described, a seaming head comprising a housing consisting of a plate and a bell removably secured thereto, and a seaming mechanism supported therein with freedom of interchangeability of the moving parts.

23. In a device of the character described, a seaming chuck adapted to internally engage the joint between a can and a cover to be seamed, a plurality of seaming rolls mounted in peripheral relation adapted to externally engage the joint and spring means associated with the rolls for rendering their engagement with the joint yieldable.

24. In a device of the character described, a seaming head including a rotary disc, a rotary supporting member mounted in coaxial relation thereto having a radial slot therein, a block slidable in said slot having a seaming roll associated therewith, a cam groove in the disc and a pin extending from the block engaging the cam groove for radially guiding the block.

25. In a device of the character described, a seaming head including a rotary disc, a rotary supporting member mounted in coaxial relation thereto having a radial slot therein, a block slidable in said slot, a cam groove in the disc and a pin extending from the block engaging the cam groove for radially guiding the block, a second block slidably supported in the first block having a seaming roll depending therefrom, and spring means operating between the two blocks for allowing of slight radial motion of the second block relative to the first one.

26. In a device of the character described, a seaming head including a rotary disc, a rotary supporting member mounted in co-axial relation thereto having two pairs of radial slots therein, two pairs of blocks slidable in said slots having seaming rolls associated therewith, two cam grooves in the disc and pins extending from one pair of blocks engaging one of the grooves and and from the other pair engaging the other groove for radially guiding the blocks.

27. In a device of the character described, a seaming head including a rotary disc, a rotary supporting member mounted in co-axial relation thereto having two pairs of radial slots therein, two pairs of blocks slidable in said slots, two cam grooves in the disc and pins extending from one pair of blocks engaging one cam groove and from the other pair engaging the other groove, a second block slidable in each block having a seaming roll depending therefrom and spring means operating between the first and second blocks for allowing of slight radial motion of the latter relative to the former.

28. A holder for a can and a cover for the same comprising a semi-cylinder having tangential extensions adapted to receive the can and a marginal seat for supporting the cover, the outline of the back of the seat following a peripheral line beyond the semi-circle for holding the cover against lateral displacement.

29. In a device of the character described a turret having a radial arm thereon, a plurality of can holding elements, and means for interchangeably securing the latter to the former comprising a T associated with the radial arm and T slots in the can holding elements adapted to slidably engage the T.

WALTER E. ROONEY.